United States Patent
Lee et al.

(10) Patent No.: US 10,247,749 B2
(45) Date of Patent: Apr. 2, 2019

(54) METHOD OF OPERATING ACCELERATION SENSOR AND ELECTRONIC DEVICE THEREOF

(71) Applicant: Samsung Electronics Co., Ltd., Gyeonggi-do (KR)

(72) Inventors: Jae-Hyeok Lee, Gyeonggi-do (KR); Jin-Ho Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1149 days.

(21) Appl. No.: 14/521,312

(22) Filed: Oct. 22, 2014

(65) Prior Publication Data

US 2015/0112633 A1 Apr. 23, 2015

(30) Foreign Application Priority Data

Oct. 22, 2013 (KR) .......................... 10-2013-0126211

(51) Int. Cl.
*G01P 1/12* (2006.01)
*G01P 13/00* (2006.01)

(52) U.S. Cl.
CPC .............. *G01P 1/127* (2013.01); *G01P 13/00* (2013.01)

(58) Field of Classification Search
CPC ........................................................ G01P 1/127
See application file for complete search history.

(56) References Cited

U.S. PATENT DOCUMENTS

| 6,498,996 | B1 * | 12/2002 | Vallot | G01C 19/56 702/103 |
|---|---|---|---|---|
| 2010/0148944 | A1 * | 6/2010 | Kim | G06F 3/016 340/407.1 |
| 2011/0077865 | A1 * | 3/2011 | Chen | A61B 5/1117 702/3 |
| 2013/0231890 | A1 | 9/2013 | Schifferdecker et al. | |

* cited by examiner

*Primary Examiner* — John E Breene
*Assistant Examiner* — Jeffrey C Morgan (57) ABSTRACT

Provided is an acceleration sensor operating method of an electronic device. The method includes checking whether at least one movement generation means operates. The method also includes changing a sampling frequency of the acceleration sensor when the movement generation means operates. The method further includes receiving a sensor value of the acceleration sensor according to the changed sampling frequency.

11 Claims, 7 Drawing Sheets

METHOD OF OPERATING ACCELERATION SENSOR AND ELECTRONIC DEVICE THEREOF

CROSS-REFERENCE TO RELATED APPLICATION(S) AND CLAIM OF PRIORITY

The present application is related to and claims the benefit under 35 U.S.C. § 119 to a Korean patent application filed in the Korean Intellectual Property Office on Oct. 22, 2013 and assigned Serial No. 10-2013-0126211, the entire disclosure of which is hereby incorporated by reference.

TECHNICAL FIELD

Various embodiments of the present disclosure relate generally to an electronic device, for example, a method for operating an acceleration sensor and an electron device thereof.

BACKGROUND

With recent developments of multimedia technologies, electronic devices having various functions are introduced. Such electronic devices generally have a convergence function performing a combination of one or more functions.

Furthermore, mobile terminals so called 'smartphones' are mainly used as electronic devices. Such mobile terminals may include large-screen touch display modules and also high-resolution camera modules in addition to a basic function for communicating with the other party, so that it is possible to capture still images and videos. Additionally, such mobile terminals may play multimedia content such as music and video and also perform web browsing in access to a network. Such mobile terminals advance gradually with high-performance processors so as to perform various convergence functions faster. Therefore, they develop remarkably so that a main function for communicating with the other party becomes regarded as an additional function.

Moreover, an electronic device may include sensors for performing various equipped functions. Such sensors may include various sensors, for example, an image sensor for capturing a subject of a camera module, a proximity sensor for detecting the proximity of an external object to an electronic device to control an output state of the electronic device, an illumination sensor for automatically controlling the brightness of a display module according to the brightness of ambient light, a geomagnetic sensor for detecting a direction of an electronic device by using terrestrial magnetism, a temperature sensor for detecting an ambient temperature and displaying it on an electronic device to provide convenience to a user, a hole sensor for detecting magnetism, a fingerprint sensor for recognizing the user's fingerprint to apply it to a security function, and an acceleration sensor for detecting a movement of an electronic device and outputting a corresponding function according to corresponding movement information.

The acceleration sensor among the above sensors may be applied to various application programs executed in an electronic device, for example, screen rotation according to a movement of an electronic device in games. Therefore, the accurate detection function of an acceleration sensor according to a movement of an electronic device is very important.

SUMMARY

To address the above-discussed deficiencies, it is a primary object to provide a method of operating an acceleration sensor and an electronic device thereof.

In a first example, a method of operating an acceleration sensor implemented to detect only an intended movement of an electronic device and an electronic device thereof is disclosed.

In a second example, a method of operating an acceleration sensor implemented to detect only an intended movement of an electronic device so that it contributes to the reliability of the electronic device and an electronic device thereof is disclosed.

In a third example, a method of operating an acceleration sensor with reduced manufacturing costs and an electronic device thereof is disclosed.

In a fourth example, a method of operating an acceleration sensor implemented to reduce current consumption and an electronic device thereof is disclosed.

In a fifth example, a method of operating an acceleration sensor implemented to exclude installation limitation of the acceleration sensor and an electronic device thereof is disclosed.

In a sixth example, an acceleration sensor operating method of an electronic device is disclosed. The method includes checking whether at least one movement generation means operates. The method also includes changing a sampling frequency of the acceleration sensor when the movement generation means operates. The method further includes receiving a sensor value of the acceleration sensor according to the changed sampling frequency.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. The following description with reference to the accompanying drawings is provided to assist in a comprehensive understanding of exemplary embodiments of the disclosure as defined by the claims and their equivalents. The following description includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Various embodiments of the present disclosure may be applied to an electronic device where a touch screen display module performing an input process through an input device and a display process through a display unit in one physical screen is used.

Various embodiments of the present disclosure may be applied to various electronic devices including a movement generation means that is a physical noise source for an acceleration sensor and provides an unintended movement of an electronic device and an acceleration sensor for detecting it. According to an embodiment of the present disclosure, a movement generation means may be a vibrator used for a haptic providing means of an electronic device. According to an embodiment of the present disclosure, the vibrator may include at least one motor having at least one trembler.

In describing various embodiments of the present disclosure, they may be applied to various devices including an acceleration sensor for detecting a movement of an electronic device, for example, personal digital assistant (PDAs), laptop computers, mobile phones, smartphones, Netbooks, mobile internet devices (MIDs), ultra mobile PC (UMPCs), tablet PCs, and navigation systems.

The movement generation means may be at least one vibrator mounted on the electronic device.

The checking of whether the movement generation means operates may include checking whether the vibrator vibrates directly in a notification method according to a call reception of the electronic device or whether a program operating the vibrator is executed.

The changing of the sampling frequency of the acceleration sensor may include increasing the sampling frequency to be higher than a default sampling frequency of the acceleration sensor.

The sampling frequency of the acceleration sensor before the change may be in a range of about 10 Hz to about 20 Hz.

The changed sampling frequency of the acceleration sensor may be in a range of about 80 Hz to about 100 Hz.

The method may further include, after the changing of the sampling frequency of the acceleration sensor, filtering the changed sampling frequency through a filtering means. The method may also include receiving the acceleration sensor value according to the filtered sampling frequency.

The filtering means may be a low path filter (LPF).

The method may further include, after the receiving of the sensor value of the acceleration sensor according to the changed sampling frequency, checking whether the operation of the movement generation means stops. The method may also include changing the sampling frequency of the acceleration sensor into a predetermined sampling frequency when the movement generation means stops.

The changing of the sampling frequency of the acceleration sensor into the predetermined sampling frequency may include restoring to the sampling frequency of the acceleration sensor before the change.

The changing of the sampling frequency of the acceleration sensor into the predetermined sampling frequency may include checking a currently running program mode after the operation of the movement generation means stops. The changing of the sampling frequency of the acceleration sensor into the predetermined sampling frequency may also include changing the sampling frequency of the acceleration sensor to a sampling frequency corresponding to the checked program mode.

According to another aspect of the present disclosure, an electronic device includes at least one acceleration sensor. The electronic device also includes at least one movement generation means. The electronic device further includes at least one processor changing a sampling frequency of the acceleration sensor when the movement generates means operates and receiving a sensor value of the acceleration sensor according to the changed sampling frequency.

The movement generation means may be at least one vibrator mounted on the electronic device.

The processor may check whether the vibrator vibrates directly in a notification method according to a call reception of the electronic device or whether a program mainly operating the vibrator is executed.

The processor may increase the sampling frequency to be higher than a default sampling frequency of the acceleration sensor.

The device may further include a filtering means filtering the changed sampling frequency.

The device may further include a switching means changing a path from an acceleration sensor to perform filtering by using the filtering means according to an operation of the movement generation means.

The processor may change the sampling frequency of the acceleration sensor into a predetermined sampling frequency when the movement generation means stops.

The processor may check a currently performed program mode after the operation of the movement generation means stops and may change the sampling frequency of the acceleration sensor to a sampling frequency corresponding to the checked program mode.

According to another aspect of the present disclosure, an electronic device includes at least one acceleration sensor. The electronic device also includes at least one vibrator. The electronic device further includes a low path filter (LPF) filtering an up-changed sampling frequency delivered from the acceleration sensor. The electronic device includes a switching means configured to switch a path of the acceleration sensor to the LPF to filter the up-changed sampling frequency. The electronic device also includes at least one processor configured to up-change a sampling frequency of the acceleration sensor when the vibrator operates, filter the up-changed sampling frequency through the LPF by controlling the switching means, and receive a sensor value of the acceleration sensor according to the filtered sampling frequency.

Hereinafter, exemplary embodiments of the present disclosure are described in detail.

Figure 1:
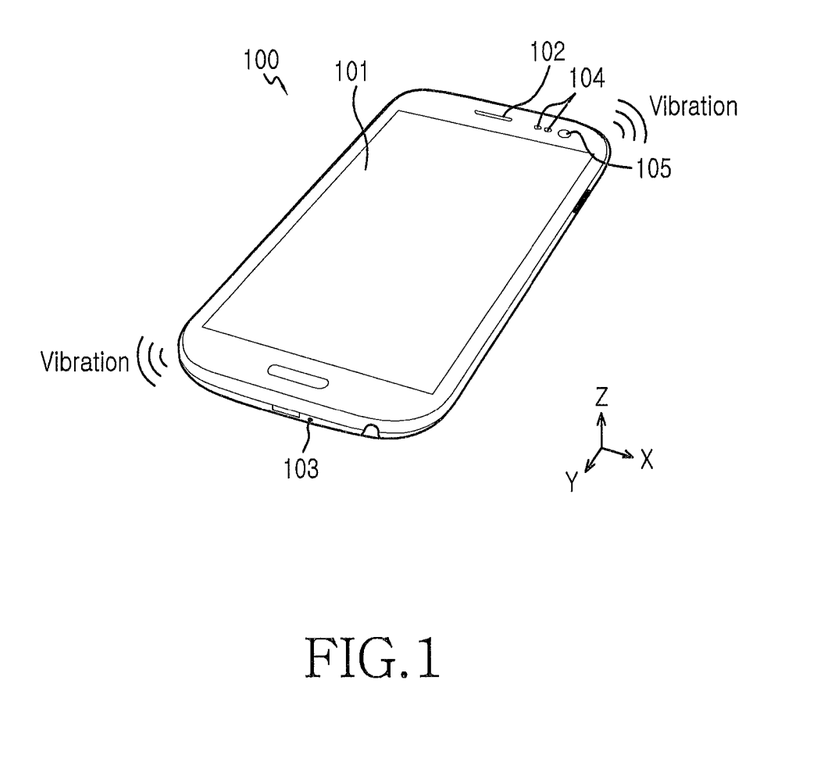
FIG. 1 is a perspective view of an example electronic device including an acceleration sensor according to this disclosure.

FIG. 1 is a perspective view of an example electronic device including an acceleration sensor according to this disclosure.

Referring to FIG. 1, a display module 101 is installed at the front surface of the electronic device 100, a speaker module 102 for receiving the voice of the other party is installed at an upper part of the display module 101, and a microphone module 103 for transmitting voice to the other party is installed at a lower part of the display module 101, so that the electronic device 100 may perform a basic communication function. According to an embodiment of the present disclosure, the display module 101 may be a touch screen device where an input/output of data is performed in the same place. According to an embodiment of the present disclosure, the display module 101 may include an object detection dedicated sensor means for detecting data inputted by an additional data input object (for example, a 'touch pen'). According to an embodiment of the present disclosure, an interface connector module for performing a data transmission function wired with an external device or receiving external power to charge a battery pack may be disposed a one part of the microphone module 103 of the electronic device 100.

According to various embodiments of the present disclosure, at least one sensor module 104 including sensing components for performing various functions of the electronic device 100 may be disposed around the speaker module 102. According to an embodiment of the present disclosure, the sensor module 104 may be installed to operate the electronic device 100 variably according to the ambient environment. According to an embodiment of the present disclosure, the sensor module 104 may include an illumination sensor for detecting an ambient illumination and automatically adjusting the brightness of the display module 101 according to the detected illumination value and a proximity sensor or an infrared sensor for, when the electronic device 100 is close to the head portion of a user during a call or a flip cover is applied as an accessory, by detecting the opening and closing thereof, deactivating the display module 101 or performing a corresponding function. According to an embodiment of the present disclosure, a video communication camera module 105 for video telephony (VT) with the other party may be installed at a proper place of the front surface of the electronic device 100.

According to various embodiment of the present disclosure, when receiving a call from the other party or a program such as a game is executed, the electronic device 100 may further include a vibrator for providing haptic sense as notification information to a user. According to an embodiment of the present disclosure, the vibrator includes at least one trembler and also may include a drive motor to provide vibration to a user by rotating a trembler eccentrically.

According to various embodiments of the present disclosure, an electronic device may include an acceleration sensor for sensing a movement of the electronic device 100. According to an embodiment of the present disclosure, the acceleration sensor detects a movement of an electronic device and controls an output of data according to a corresponding movement. For example, when detecting that an electronic device rotates in a predetermined direction, the acceleration sensor may rotate the screen in correspondence to this and display it. According to an embodiment of the present disclosure, while a game is executed, an electronic device may detect a movement thereof through an acceleration sensor in order to perform a corresponding function according to a game scenario.

In general, when a vibrator operates, a fine movement is provided to an electronic device. Due to this, an acceleration sensor detects the movement and determines it as a normal movement of the electronic device to cause malfunction. According to an embodiment of the present disclosure, since the vibration and rotation direction of the vibrator and the sensing axis of the acceleration sensor are the same, this may affect the acceleration sensor directly due to a vibrator resonance phenomenon. In order to prevent this, the vibrator and the acceleration sensor may be spaced a predetermined distance (for example, about 4.5 cm) apart from each other in an electronic device but this may be contrary to the trend that electronic devices become smaller, lighter, and thinner.

According to an embodiment of the present disclosure, in order to filter the vibration noise of a vibrator, if the accuracy is improved by increasing the number of data obtained from sampling of the acceleration sensor, sensing may become slower and thus the performance of the acceleration sensor may deteriorate.

According to various embodiments of the present disclosure, sensing accuracy may be obtained by boosting the sampling during the detection of an operation of the vibrator and influence on current consumption may be minimized. According to an embodiment of the present disclosure, when the vibrator vibrates, by increasing a sampling frequency of the acceleration sensor at each corresponding time, the maximum sampling for the vibrator may be achieved.

Hereinafter, a configuration of an electronic device is described in more detail.

Figure 2:
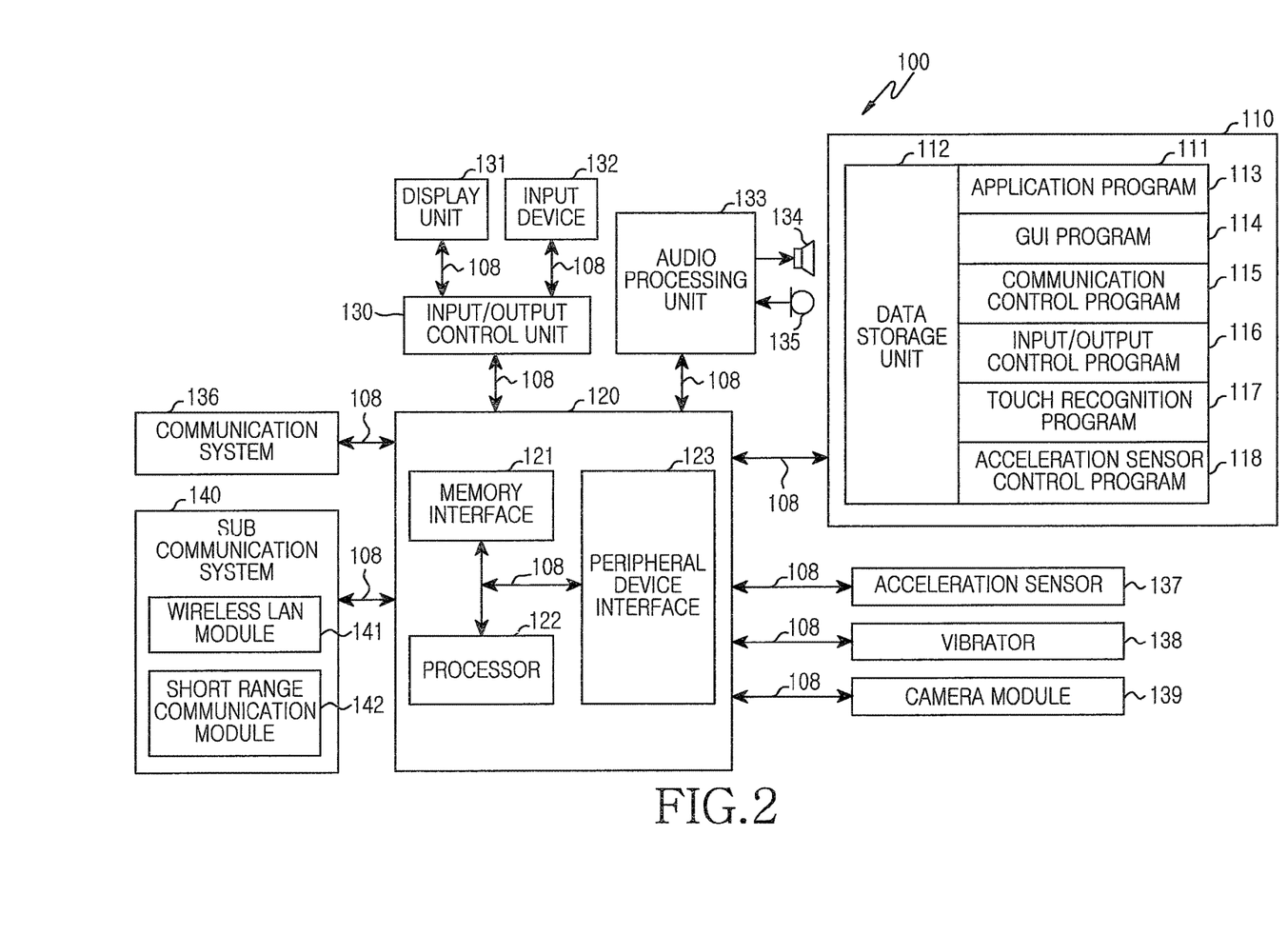
FIG. 2 is a block diagram illustrating an example configuration of an electronic device according to this disclosure.

FIG. 2 is a block diagram illustrating an example configuration of an electronic device according to this disclosure.

Referring to FIG. 2, the electronic device 100 may include a memory 110, a processor unit 120, an input/output control unit 130, a display unit 131, an input device 132, an audio processing unit 133, a communication system 136, a sub communication system 140, a vibrator 138, and an acceleration sensor 137. The components may communicate with each other through at least one communication bus or signal line 108.

Each component is described as follows.

A memory 110 may include a program storage unit 111 for storing a program to control an operation of the electronic device 100 and a data storage unit 112 for storing data generated during program execution, and thus may store data generated from a program during an operation of a processor 122.

According to an embodiment of the present disclosure, a data storage unit 112 may store database information used for determining related programs executed through an acceleration sensor control program 118 and may store data such as setting information necessary to configure an operation a graphic user interface (GUI) while related programs are displayed on a display unit 131.

According to an embodiment of the present disclosure, the processor 122 may rotate the screen of the display unit 131 or control a movement of an object in a game play screen in order to correspond to a movement of an electronic device according to a game scenario on the basis of information executed by the acceleration control program 118 according to the detection of the acceleration sensor 137.

According to an embodiment of the present disclosure, the program storage unit 111 may include an application program 113, a GUI program 114, a communication control program 115, an input/output control program 116, a touch recognition program 117, and an acceleration sensor control program 118. Herein a program in the program storage unit 111 may be configured with a set of instructions and thus may be expressed in an instruction set. According to an embodiment of the present disclosure, the application program 113 may include a software component for at least one application program installed in the electronic device 100.

According to an embodiment of the present disclosure, the GUI program 114 may include at least one software component for providing a user interface as graphic. For example, the GUI program 113 may display application program information driven by the processor 122 on the display unit 131.

According to an embodiment of the present disclosure, the communication control program 115 may include at least one software component to control communication with at least one another electronic device by using a communication system 136 and/or a sub communication system 140. For example, the communication control program 115 may search for another electronic device to connect communication. If another electronic device for communication connection is found, the communication control program 115 may set up communication for another electronic device. Then, the control program 115 may transmit/receive data to/from another electronic device through a communication system 136 by performing capability discovery and session establishment procedures with another connected electronic device.

According to an embodiment of the present disclosure, the input/output control program 116 displays an operation of the electronic device 100 on the display unit 131 and receives an operation instruction of the electronic device 100 from the outside through the input device 132.

According to an embodiment of the present disclosure, the touch recognition program 117 may perform a function for moving, storing, zooming-in or zooming-out image information displayed on the display unit though a touch input by receiving a control of the processor 22.

According to an embodiment of the present disclosure, the acceleration sensor control program 118 may selectively change a sampling frequency of the acceleration sensor 137 by receiving a control of the processor 122. According to an embodiment of the present disclosure, the acceleration sensor control program 118 may change a sampling frequency of the acceleration sensor 137 into a predetermined frequency and output it while the vibrator 137 operates by receiving a control of the processor 122. According to an embodiment of the present disclosure, the acceleration sensor control program 118 may change a sampling frequency of the acceleration sensor 137 into a default frequency when the vibrator 137 stops by receiving a control of the processor 118. According to an embodiment of the present disclosure, the acceleration sensor control program 118 may change a sampling frequency of the acceleration sensor 137 into a sampling frequency corresponding to a currently running program of the electronic device 100 by receiving a control of the processor 118.

According to an embodiment of the present disclosure, the memory 110 in the electronic device 100 may be configured to be one or more. According to an embodiment of the present disclosure, the memory 110 may perform a function of only the program storage unit 111 or a function of only the data storage unit 112 or perform both functions according to a purpose and in terms of device characteristics, the internal physical area division of the memory 110 may not be obvious.

According to an embodiment of the present disclosure, the processor unit 120 may include a memory interface 121, at least one processor 122, and a peripheral device interface 123. Here, the memory interface 121, the at least one processor 122, and the peripheral device interface 123 included in the processor unit 120 may be integrated into at least one circuit or may be implemented separately.

According to an embodiment of the present disclosure, the memory interface 121 may control an access to the memory 110 from a component such as the processor 122 or the peripheral device interface 123.

According to an embodiment of the present disclosure, the peripheral device interface 123 may control a connection of an input/output peripheral device, the processor 122, and the memory interface 121.

According to an embodiment of the present disclosure, the processor 122 controls the electronic device 100 to provide services such as various multimedia and communication by using at least one software program, displays a GUI operation of the electronic device 100 on the display unit 131 through the input/output processing unit 130 in order for confirmation, and provides an instruction received from the outside of the electronic device 100 to the input device 132. At this point, the processor 122 may provide a service corresponding to a corresponding program by executing at least one program stored in the memory 110.

According to various embodiments of the present disclosure, the processor 122 may change a sampling frequency of the acceleration sensor 137 by using the acceleration control program 118. According to an embodiment of the present disclosure, while the vibrator 138 of the electronic device 100 operates, the processor 122 may detect it by using the acceleration control program 118 and may then increase the sampling frequency of the acceleration sensor 137. According to an embodiment of the present disclosure, the processor 122 may control a switching means so as to filter the detect signal of the acceleration sensor 137 having an increased sampling frequency by using the filtering means. According to an embodiment of the present disclosure, when an operation of the vibrator 138 stops, the processor 122 may check a currently running program and may control the acceleration sensor control program 118 to change a sampling frequency of the acceleration sensor 137 into a sampling frequency corresponding to a corresponding program.

According to an embodiment of the present disclosure, the audio processing unit 133 may provide an audio interface between a user and the electronic device 100 through the speaker 134 and the microphone 135.

According to an embodiment of the present disclosure, the communication system 136 may connect the electronic device 100 to an external device by using at least one antenna device according to a control of the processor 122. The communication system 136 may transmit/receive wireless signals in order for a voice call, a video call, short message service (SMS), multimedia messaging service (MMS), and data communication with a terminal such as a smartphone having phone numbers inputted to the electronic device 100, a tablet PC, or another portable device.

According to an embodiment of the present disclosure, the sub communication system 140 may include a wireless LAN module 141 and a short range communication module 142. According to an embodiment of the present disclosure, the wireless LAN module 141 may be wirelessly connected to internet in a place where an access point (AP) is installed according to a control of a processor. The wireless LAN module 141 supports the wireless LAN standard (such as IEEE802.11x) of the Institute of Electrical and Electronics Engineers (IEEE). According to an embodiment of the present disclosure, the short range communication module 142 may perform short range communication wirelessly between the electronic device 100 and an external device according to a control of a processor. The short range communication may include Bluetooth, infrared data association (IrDA), and Near Field Communication (NFC).

According to an embodiment of the present disclosure, the input/output control unit 130 may provide an interface between an input/output device such as the display unit 131 and the input device 132 and the peripheral device interface 123.

According to an embodiment of the present disclosure, the input device 132 may provide input data generated by a user's selection to the processor unit 120 through the input/output processing unit 130. For example, the input device 132 may be configured with a control button for controlling the electronic device 100. According to an embodiment of the present disclosure, the input device 132 may be configured with a keypad for receiving input data from a user.

According to an embodiment of the present disclosure, the display unit 131 may receive state information of the electronic device 100, characters entered by a user, moving pictures, and still pictures from the processor unit 120 and display them through the input/output processing unit 130. According to an embodiment of the present disclosure, like the input device 132, when the display unit 131 is configured with a touch screen, a function of the display unit 131 and a function of the input device 132 may be all performed on one touch screen.

According to an embodiment of the present disclosure, the camera module 139 may include an image sensor and may capture a subject by a control of a processor.

Figure 3:
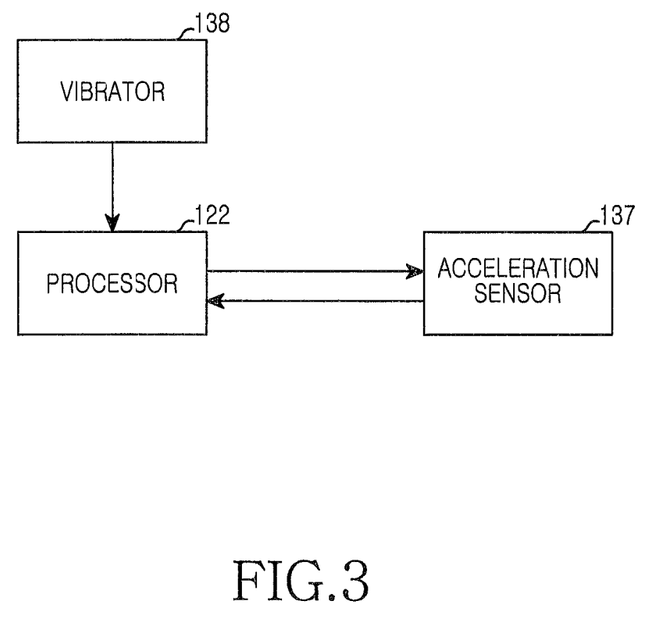
FIG. 3 is a block diagram illustrating an example main configuration of an electronic device according to this disclosure.

FIG. 3 is a block diagram illustrating an example main configuration of an electronic device according to this disclosure.

Referring to FIG. 3, the electronic device 100 may include a processor 122, a vibrator 138 delivering a drive signal to the processor 122 and an acceleration sensor 137 varying a sampling frequency by receiving a control of the processor 122 according to whether the vibrator 138 is driven.

According to an embodiment of the present disclosure, the processor 122 may change a sampling frequency of the acceleration sensor 137 by receiving an operation signal of the vibrator 138. According to an embodiment of the present disclosure, as shown in FIG. 3, an operation signal of the vibrator 138 may be delivered to the processor 122 but the present disclosure is not limited thereto. For example, the processor 122 may change a sampling frequency of the acceleration sensor 137 by detecting the execution of a corresponding program for mainly driving the vibrator 138.

According to an embodiment of the present disclosure, the vibrator 138 may be a movement generation means that is unintentionally detected by the acceleration sensor 137 but the present disclosure is not limited thereto. For example, the processor 122 may change a sampling frequency of the acceleration sensor 137 depending on whether various movement generation means disposed in the electronic device 100 providing physical noise to an acceleration sensor in addition to a vibrator are driven.

Figure 4:
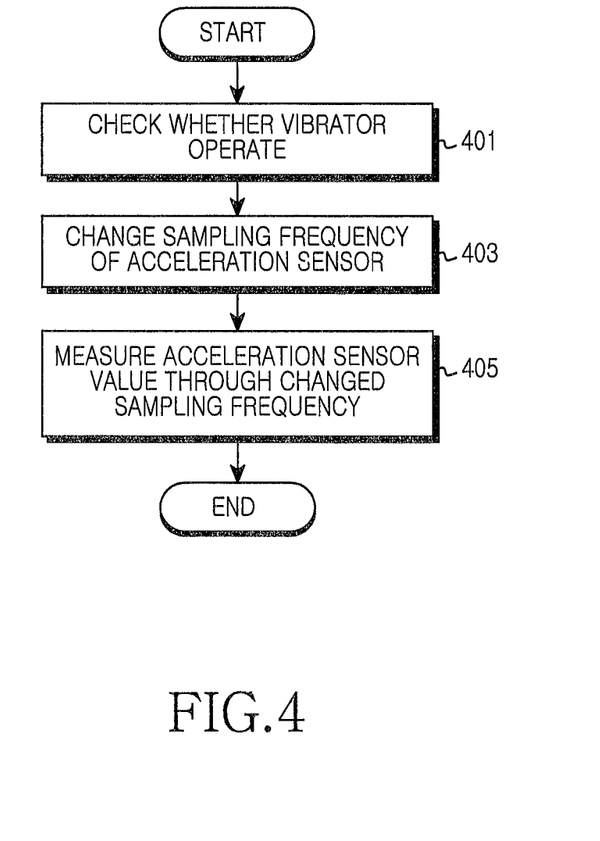
FIG. 4 is a flowchart illustrating an example method of operating an acceleration sensor of an electronic device according to this disclosure.

FIG. 4 is a flowchart illustrating an example method of operating an acceleration sensor of an electronic device according to this disclosure.

Referring to FIGS. 3 and 4, the electronic device 100 may perform operation 401 for checking an operation of the vibrator 138. According to an embodiment of the present disclosure, when the electronic device 100 is applied as a mobile communication terminal, the vibrator 138 may operate when a notification mode notifying a call received from the other party to a user is a vibration mode. According to an embodiment of the present disclosure, the vibrator 138 may operate in a vibration mode according to a game scenario during game play.

Then, the electronic device 100 may perform operation 403 for changing a sampling frequency of the acceleration sensor 137 when it is confirmed that the vibrator 138 operates. According to an embodiment of the present disclosure, when a sampling frequency of the acceleration sensor 137 operates in a sampling frequency range, for example of about 10 Hz to about 20 Hz before a vibration mode is executed, after the vibrator 138 operates, the acceleration sensor 137 may be controlled to be operate in a sampling frequency range, for example of about 80 Hz to about 100 Hz. This is because a changed sampling frequency range of the acceleration sensor 137 may include a range of about 40 Hz to about 60 Hz, that is, a range of a frequency according to the vibration of the vibrator 138. Then, the electronic device 100 may perform operation 405 for measuring an acceleration sensor value through the changed sampling frequency.

Figure 5:
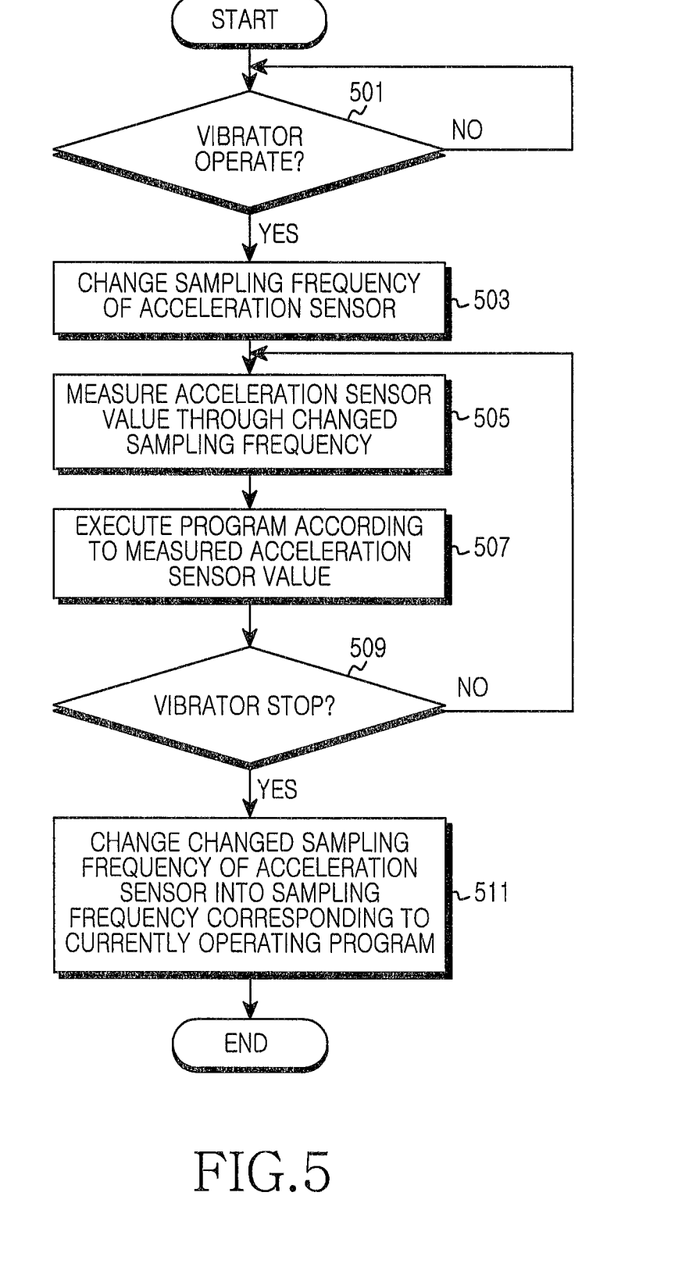
FIG. 5 is a flowchart illustrating an example method of operating an acceleration sensor of an electronic device according to this disclosure.

FIG. 5 is a flowchart illustrating an example method of operating an acceleration sensor of an electronic device according to this disclosure.

Referring to FIGS. 3 and 5, the electronic device 100 may perform operation 501 for checking an operation of the vibrator 138. According to an embodiment of the present disclosure, when the electronic device 100 is applied as a mobile communication terminal, the vibrator 138 may operate when a notification mode notifying a call received from the other party to a user is a vibration mode. According to an embodiment of the present disclosure, the vibrator 138 may operate in a vibration mode according to a game scenario during game play.

Then, the electronic device 100 may perform operation 503 for changing a sampling frequency of the acceleration sensor 137 when it is confirmed that the vibrator 138 operates. According to an embodiment of the present disclosure, the acceleration sensor 137 may be controlled to operate in a range of a sampling frequency higher than a sampling frequency of before a vibration mode is executed.

Then, the electronic device 100 may perform operation 505 for measuring an acceleration sensor value through the changed sampling frequency and may then enter operation 507 to execute a program according to the measured acceleration sensor value. According to an embodiment of the present disclosure, even when the vibrator 138, which is a source of the physical noise of the acceleration sensor 137 and causes malfunction, operates, the acceleration sensor 137 set to operate in a range of a sampling frequency higher than a vibration period of the vibrator 138 may perform a normal sensing operation. According to an embodiment of the present disclosure, even when the vibrator 138 is used in a game mode, since the electronic device 100 confirms the game mode using the vibrator 138 and measures a sensor value of the acceleration sensor 137 operating through a changed sampling frequency while a corresponding game mode is executed, the false detection of the acceleration sensor 137 due to the vibration of the vibrator 138 may be prevented in advance.

Moreover, the electronic device 100 may perform operation 509 for checking whether the vibrator 138 stops. According to an embodiment of the present disclosure, in the case of a game mode in which the vibrator 138 is used mainly, the electronic device 100 may perform an operation for checking whether a corresponding game mode is terminated alternatively. According to an embodiment of the present disclosure, when a program using the vibrator 138 mainly is executed, the electronic device 100 may perform an operation for checking whether a corresponding program is terminated alternatively.

Then, when it is confirmed that the vibrator 138 stops, a game mode in which the vibrator 138 is driven mainly is terminated, or a corresponding program in which the vibrator 138 is used mainly is terminated in operation 509, the electronic device 100 enters operation 511 so as to change the changed sampling frequency of the acceleration sensor 137 into a sampling frequency corresponding to a currently operating program. According to an embodiment of the present disclosure, the changed sampling frequency of the acceleration sensor 137 may be changed into a sampling frequency before an initial change.

Figure 6:
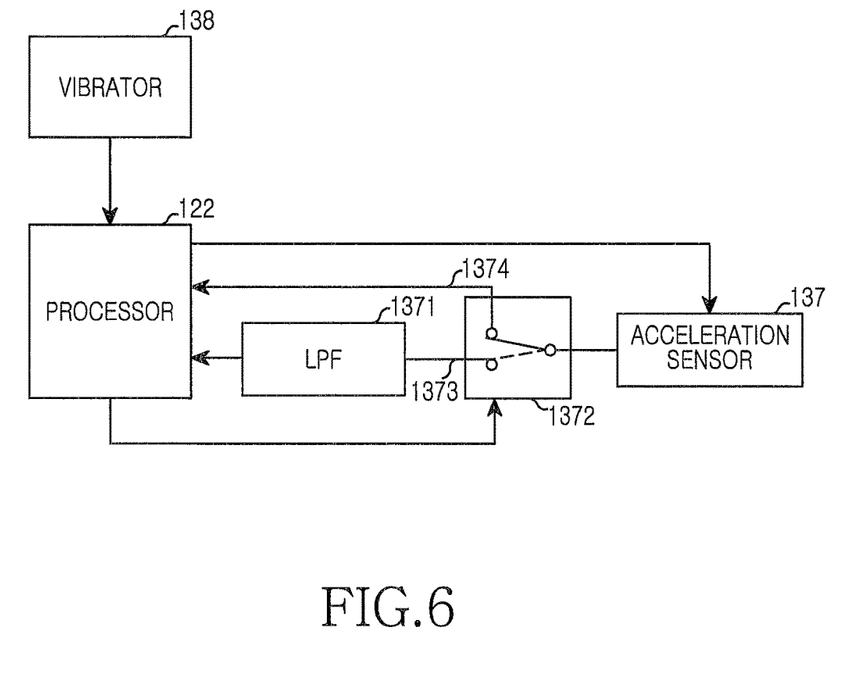
FIG. 6 is a block diagram illustrating an example main configuration of an electronic device according to this disclosure.

FIG. 6 is a block diagram illustrating an example main configuration of an electronic device according to this disclosure.

Referring to FIG. 6, the electronic device 100 may include a processor 122, a vibrator 138 delivering a drive signal to the processor 122, an acceleration sensor 137 varying a sampling frequency by receiving a control of the processor 122 according to whether the vibrator 138 is driven, a switching means 1372 switching by a control of the processor 122 according to whether the vibrator 138 operates, and a filtering means 1362 filtering the changed sampling frequency of the acceleration sensor 137 to provide it to the processor 122 by forming a path 1373 through the switching means 1372 when the vibrator 138 operates.

According to an embodiment of the present disclosure, the processor 122 may change a sampling frequency of the acceleration sensor 137 by receiving an operation signal of the vibrator 138. According to an embodiment of the present disclosure, as shown in the drawing, an operation signal of the vibrator 138 may be delivered to the processor 122 but the present disclosure is not limited thereto. For example, the processor 122 may change a sampling frequency of the acceleration sensor 137 by detecting the execution of a corresponding program for mainly driving the vibrator 138.

According to an embodiment of the present disclosure, the vibrator 138 may be a movement generation means that is unintentionally detected by the acceleration sensor 137 but the present disclosure is not limited thereto. For example, the processor 122 may change a sampling frequency of the acceleration sensor 137 depending on whether various movement generation means disposed in the electronic device 100 providing physical noise to an acceleration sensor in addition to a vibrator are driven.

According to an embodiment of the present disclosure, when the vibrator 138 does not operate by receiving a control of the processor 122, the switching means 1372 may switch to the path 1374 through which a sensor value of the acceleration sensor 137 is directly delivered to the processor 122, excluding the filtering means 1371. According to an embodiment of the present disclosure, such a sensor value may be a sensor value according to a sampling frequency set by default.

According to an embodiment of the present disclosure, when the vibrator 138 operates by receiving a control of the processor 122, the switching means 1372 may deliver a sensor value of the acceleration sensor 137 by the filtered sampling frequency to the processor 122 through the filtering means 1371. According to an embodiment of the present disclosure, such a sensor value may be obtained through a low path filter (LPF) passing only a relatively low sampling frequency band.

Figure 7:
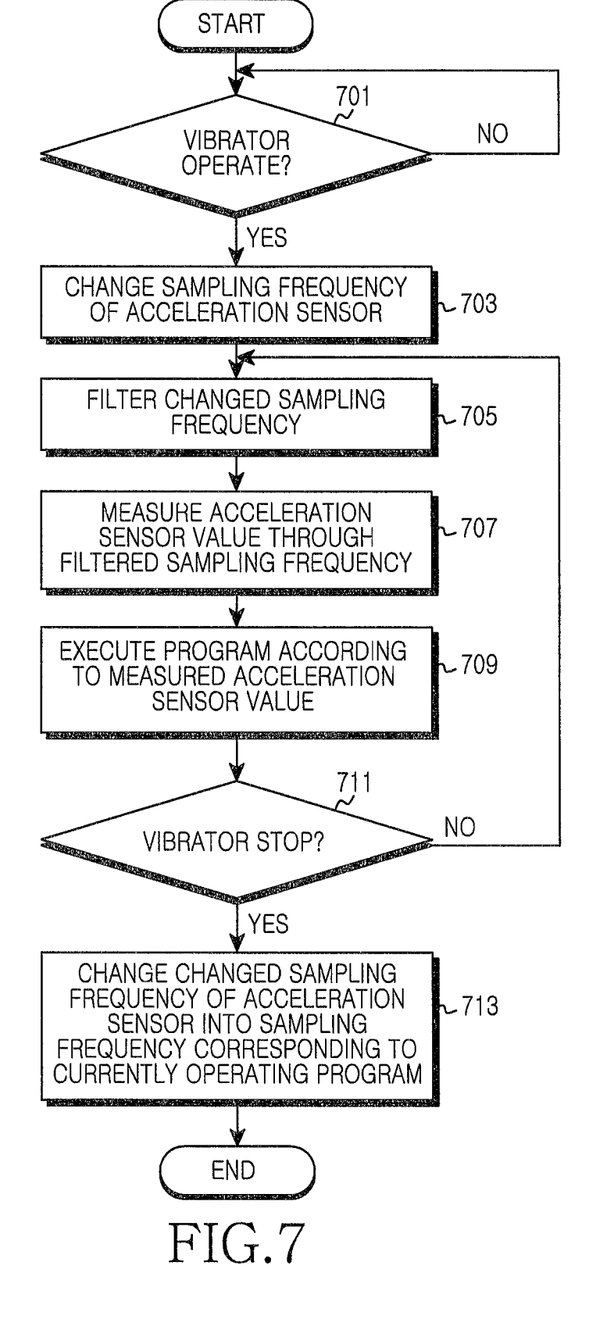
FIG. 7 is a flowchart illustrating an example method of operating an acceleration sensor of an electronic device according to this disclosure.

FIG. 7 is a flowchart illustrating an example method of operating an acceleration sensor of an electronic device according to this disclosure.

Referring to FIG. 7, the electronic device 100 may perform operation 701 for checking an operation of the vibrator 138. According to an embodiment of the present disclosure, when the electronic device 100 is applied as a mobile communication terminal, the vibrator 138 may operate when a notification mode notifying a call received from the other party to a user is a vibration mode. According to an embodiment of the present disclosure, the vibrator 138 may operate in a vibration mode according to a game scenario during game play.

Then, the electronic device 100 may perform operation 703 for changing a sampling frequency of the acceleration sensor 137 when it is confirmed that the vibrator 138 operates. According to an embodiment of the present disclosure, the electronic device 100 may control the acceleration sensor 137 to operate in a range of a sampling frequency higher than a sampling frequency of before a vibration mode is executed.

According to an embodiment of the present disclosure, when a sampling frequency of the acceleration sensor 137 operates in a sampling frequency range, for example of about 10 Hz to about 20 Hz before an operation of the vibration 138 is executed, after the vibrator 138 operates, the acceleration sensor 137 may be controlled to operate in a sampling frequency range, for example of about 80 Hz to about 100 Hz. This is because a changed sampling frequency range of the acceleration sensor 137 may include a range of about 40 Hz to about 60 Hz, that is, a range of a frequency according to the vibration of the vibrator 138.

Then, the electronic device 100 may enter operation 705 to filter the changed sampling frequency by the predetermined filtering means 1371. According to an embodiment of the present disclosure, the filtering means 1371 may use an LPF to exclude a frequency of the vibrator 138 included in the up changed sampling frequency.

Then, the electronic device 100 may perform operation 707 for measuring an acceleration sensor value through the filtered sampling frequency and may then enter operation 709 to execute a program according to the measured acceleration sensor value. According to an embodiment of the present disclosure, even when the vibrator 138, which is a source of the physical noise of the acceleration sensor 137 and causes malfunction, operates, the filtered acceleration sensor 137 is changed to operate in a range of a sampling frequency higher than a vibration period of the vibrator 138 and may perform a normal sensing operation. According to an embodiment of the present disclosure, even when the vibrator 138 is used in a game mode, since the electronic device 100 confirms the game mode using the vibrator 138 and measures a sensor value of the acceleration sensor 137 operating in the filtered sampling frequency changed and filtered while a corresponding game mode is executed, the false detection of the acceleration sensor 137 due to the vibration of the vibrator 138 may be prevented in advance.

Moreover, the electronic device 100 may perform operation 711 for checking whether the vibrator 138 stops. According to an embodiment of the present disclosure, in the case of a game mode in which the vibrator 138 is used mainly, the electronic device 100 may perform an operation for checking whether a corresponding game mode is terminated alternatively. According to an embodiment of the present disclosure, when a program using the vibrator 138 mainly is executed, the electronic device 100 may perform an operation for checking whether a corresponding program is terminated alternatively.

Then, when it is confirmed that the vibrator 138 stops, a game mode in which the vibrator 138 is driven mainly is terminated, or a corresponding program in which the vibrator 138 is used mainly is terminated in operation 711, the electronic device 100 enters operation 713 so as to change the changed sampling frequency of the acceleration sensor 137 into a sampling frequency corresponding to a currently operating program. According to an embodiment of the present disclosure, the changed sampling frequency of the acceleration sensor 137 may be changed into a sampling frequency before an initial change.

According to various embodiments of the present disclosure, the electronic device 100 checks an operation of the vibrator 138 that is a cause of the false detection of the acceleration sensor 137 by physical noise and boots a sampling frequency of the acceleration sensor 137 only during an operation of the vibrator 138, so that the acceleration sensor 137 may be managed to output an efficient and accurate sensing value.

According to various embodiments of the present disclosure, an acceleration sensor may have improved sensing accuracy by selectively boosting a sampling frequency according to a corresponding mode is described but the present disclosure is not limited thereto. For example, various sensors disposed at an electronic device and sensing state information of the electronic device are applicable. According to an embodiment of the present disclosure, such sensors may include at least one of a proximity sensor, an image sensor, an infrared sensor, a fingerprint recognition sensor, a temperature sensor, a geomagnetic sensor, a hole sensor, an iris sensor, and an illumination sensor.

According to various embodiments of the present disclosure, an electronic device may obtain the reliability of an electronic device by accurately detecting only an intended movement of the electronic device. Also manufacturing costs may be reduced. Furthermore, with respect to the same power supply, an electronic device may be used for a relatively long period by reducing current consumption.

While the disclosure has been shown and described with reference to certain preferred embodiments thereof, it will be understood by those skilled in the art that various changes in form and details may be made therein without departing from the spirit and scope of the disclosure as defined by the appended claims. Therefore, the scope of the disclosure is defined not by the detailed description of the disclosure but by the appended claims, and all differences within the scope will be construed as being included in the present disclosure.

What is claimed is:

1. A method in an electronic device, the method comprising:
   identifying whether at least one vibrator in the electronic device operates;
   changing a sampling frequency of an acceleration sensor in the electronic device to a higher frequency than a vibrating frequency of the vibrator, upon identifying that the vibrator operates;
   obtaining sensor data by using the changed sampling frequency; and
   obtaining refined sensing data by using a filter of the electronic device, the filter removing components of the vibration frequency from the sensing data.

2. The method of claim 1, wherein the sampling frequency of the acceleration sensor before the change is in a range of about 10 Hz to about 20 Hz.

3. The method of claim 1, wherein the changed sampling frequency of the acceleration sensor is in a range of about 80 Hz to about 100 Hz.

4. The method according to claim 1, wherein the filtering-means is a low path filter (LPF).

5. The method according to claim 1, further comprising, after the obtaining of the refined sensing data,
   identifying whether an operation of the vibrator stops; and
   changing the sampling frequency of the acceleration sensor into a predetermined sampling frequency upon identifying that the operation of the vibrator stops.

6. The method of claim 5, wherein the changing of the sampling frequency of the acceleration sensor into the predetermined sampling frequency comprises restoring to the sampling frequency of the acceleration sensor before the change upon identifying that the vibrator operates.

7. The method of claim 5, wherein the changing of the sampling frequency of the acceleration sensor into the predetermined sampling frequency comprises:
   identifying a currently running program mode after the operation of the vibrator stops; and
   changing the sampling frequency of the acceleration sensor to a sampling frequency corresponding to the identified program mode.

8. An electronic device comprising:
   at least one acceleration sensor configured to operate based on a sampling frequency for obtaining sensing data;
   at least one vibrator;
   a filter; and
   at least one processor operatively coupled to the acceleration sensor, the vibrator and the filter, configured to:
   identify whether the vibrator operates,
   change a sampling frequency of the acceleration sensor to a higher frequency than a vibrator frequency of the vibrator, upon identifying that the vibrator operates, and obtain refined sensing data by using the filter, the filter removing components of the vibrating frequency from the sensing data, wherein the sensing data is obtained based on the changed sampling frequency by the acceleration sensor.

9. The electronic device of claim 8, further comprising a switch configured to establish a path from the acceleration sensor to the processor through the filter according to an operation of the vibrator.

10. The electronic device of claim 9, wherein the processor is further configured to change the sampling frequency of the acceleration sensor into a predetermined sampling frequency upon identifying that the operation of the vibrator stops.

11. The electronic device of claim 10, wherein the processor is configured to:
  identify a currently performed program mode after the operation of the vibrator stops, and
  change the sampling frequency of the acceleration sensor to a sampling frequency corresponding to the identified program mode.

* * * * *